United States Patent
Egawa et al.

(10) Patent No.: US 6,624,969 B2
(45) Date of Patent: Sep. 23, 2003

(54) MAGNETIC HEAD WITH CUTOUTS CORRESPONDING TO THE NUMBER OF LEAD WIRES

(75) Inventors: Motoji Egawa, Iwata-gun (JP); Shigeyuki Oishi, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 106 days.

(21) Appl. No.: 09/824,058

(22) Filed: Apr. 3, 2001

(65) Prior Publication Data

US 2001/0026418 A1 Oct. 4, 2001

(30) Foreign Application Priority Data

Apr. 4, 2000 (JP) ........................ 2000-102279

(51) Int. Cl.[7] .............................................. G11B 5/133
(52) U.S. Cl. ....................................................... 360/125
(58) Field of Search ................... 360/125, 123, 360/121

(56) References Cited

U.S. PATENT DOCUMENTS 5,402,397 A * 3/1995 Ohmori et al. ........... 369/13.12
6,075,681 A * 6/2000 Egawa et al. ............... 360/128
6,226,148 B1 * 5/2001 Egawa et al. ............... 360/125
6,297,930 B1 * 10/2001 Egawa et al. ............... 360/125

FOREIGN PATENT DOCUMENTS

JP         11149608 A   *   6/1999   ......... G11B/05/127

* cited by examiner

Primary Examiner—David Davis
(74) Attorney, Agent, or Firm—Oliff & Berridge, PLC

(57) ABSTRACT

A magnetic head which can improve workability in coil formation, prevent wiring errors and is compatibly applicable to recording media having respective recording densities different from each other. Twelve cut-outs (11) are formed on four walls (10) at respective edges of a back yoke (5) and lead wires (15a, 15b) of a read/write coil (15) and lead wires (16a, 16b) of a read/write coil (16) are let separately through the respective cut-outs (11), whereby the lead wires (15a, 15b and 16a, 16b) are not mistaken for each other in wiring. Since first and second magnetic cores (2 and 3) and the read/write coils (15 and 16) corresponding thereto are provided, the magnetic head is capable of reading and writing on two recording media having respective recording densities different from each other, thereby providing compatibility for magnetic recording.

7 Claims, 5 Drawing Sheets

MAGNETIC HEAD WITH CUTOUTS CORRESPONDING TO THE NUMBER OF LEAD WIRES

BACKGROUND OF THE INVENTION

1. Field of the Invention

The present invention relates to a magnetic head, which is used in a floppy disc drive (a downwardly compatible high recording density FDD) having both a standard (i.e., low) recording density and a high recording density, or the like, and which is compatibly applicable to a plurality of recording media having respective recording densities different from each other.

2. Description of the Related Art

An example of a magnetic head used in a downwardly compatible high recording density FDD is shown in FIGS. 6 to 8.

A magnetic head 30 shown in FIGS. 6 to 8 is of a type bearing two magnetic cores 31 and 32 (for instance, a magnetic core of 120 MB type and a magnetic core of 2 MB type) having respective recording densities different from each other, and the magnetic cores 31 and 32 form respective closed magnetic circuits independent of each other. The magnetic cores 31 and 32 are inserted and positioned in slits 37 and 38 formed in a slider 35, and fastened with glass or the like. After a sliding surface of a magnetic recording medium is formed by machining such as cutting and polishing, coil windings 33 and 34 are applied on a window portion of the magnetic core respectively.

In addition, a conventional type of magnetic head without so-called compatibility is shown in FIGS. 9 and 10. The magnetic head shown in FIGS. 9 and 10 is of a so-called separated type as will be described later and used in an FDD for a standard recording density (a normal FDD). In this magnetic heads a read/write core 42 and an erasing core 43 are accommodated and held in an opening 41 formed in a substantially rectangular slider 40. A back yoke 44 is connected to the read/write core 42, the erasing core 43 and the slider 40. The back yoke 44 forms a closed magnetic circuit in association with the read/write core 42 and the erasing core 43, and supports the slider 40.

The back yoke 44 is generally comprised of a substantially rectangular back yoke body 45 which is a little larger than a slider 40, a first leg portion 46, a second leg portion 47 and a third leg portion 48 which are all standing upright in a line on one face of the back yoke body 45, and an outer circumference wall portion 49 standing upright on the outer circumference portion of the back yoke body 45 and connected to the slider 40.

The first leg portion 46 is connected to the read/write core 42 thereby forming a closed magnetic circuit with the read/write core 42. The third leg portion 48 is connected to the erasing core 42 thereby serving to form a closed magnetic circuit with the erasing core 42. The second leg portion 47 is connected to a joint portion of the read/write core 42 and the erasing core 43 thereby serving in common to form respective closed magnetic circuits with the read/write core 42 and the erasing core 43.

As mentioned above, since the back yoke body 45 is formed a little larger than the slider 40, a space 50, which is not covered by the slider 40, is formed on an upper surface of the outer circumference wall portion 49. A resin 51 is applied to this space 50 to fix the slider 40 and the back yoke 44 together.

A read/write coil 52 having three lead wires 52a, 52b and 52c is mounted on the first leg portion 46. An erasing coil 53 having two lead wires 53a and 53b is mounted on the third leg portion 48.

Two cut-outs 54a and 54b are formed on the outer circumference wall portion 49. Three lead wires 52a, 52b and 53c of the read/write coil 52 are let through the cut-out 54a to the outside, and two lead wires 53a and 53b of the erasing coil 53 are let through the cut-out 54b to the outside.

In the magnetic head shown in FIGS. 9 and 10, the resin 51 is applied to the space 50 of the upper surface of the outer circumference wall portion 49. It is difficult to control an amount of application, and the resin may be accidentally attached to the upper surface of the slider 40, or a poor adhesion may be caused due to an insufficient amount of resin.

Further, since the magnetic head shown in FIGS. 9 and 10 has one kind of recording density applicable to a recording medium and is not compatible, it is not convenient. Further, three lead wires 52a, 52b and 52c of the read/write coil 52 are let through one cut-out 54a and two lead wires 53a and 53b of the erasing coil 53 are let together let through one cut-out. This makes it happen that wires with respective different roles such as a starting end of coil or finishing end of coil are mistaken for each other when wiring. So, careful work is required thereby lowering workability and productivity.

The present invention has been made in light of the above circumstance, and an object thereof is to provide a magnetic head, which enables workability for coil termination to be increased, prevents mistake in wiring and which is compatibly applicable to recording media having respective recording densities different from each other.

According to a first aspect of the present invention, in a magnetic head comprising a slider which slides on a magnetic recording medium, and accommodates and holds a plurality of magnetic cores having respective gaps and having recording densities different from each other in a plurality of openings formed on a sliding side, respectively, and a back yoke which comprises a substantially plate-like back yoke body provided parallel to the slider, a plurality of inner pillars standing upright on the back yoke body and four walls standing upright on respective edges of the back yoke body and connected to the slider and which is connected to the magnetic cores thereby forming closed magnetic circuits, holds the slider, and includes a plurality of coils provided on the plurality of inner pillars provided corresponding to the plurality of magnetic cores, respectively, the four walls include cut-outs in number equal to or larger than number of lead wires of the plurality of coils.

According to a second aspect of the present invention, in the first aspect, at least three cut-outs are provided on each of the four walls.

According to a third aspect of the present invention, in the first or second aspect, the back yoke, the inner pillar and the walls are integrally molded using a soft magnetic material.

According to a fourth aspect of the present invention, in any one of the first to third aspects, at least two of the plurality of magnetic cores are for a standard recording density floppy disc drive and for a high recording density floppy disc drive, respectively.

DESCRIPTION OF THE PREFERRED EMBODIMENTS

Hereinafter, the first embodiment of the magnetic head of the present invention is explained based on FIGS. 1 and 2.

Figure 1:
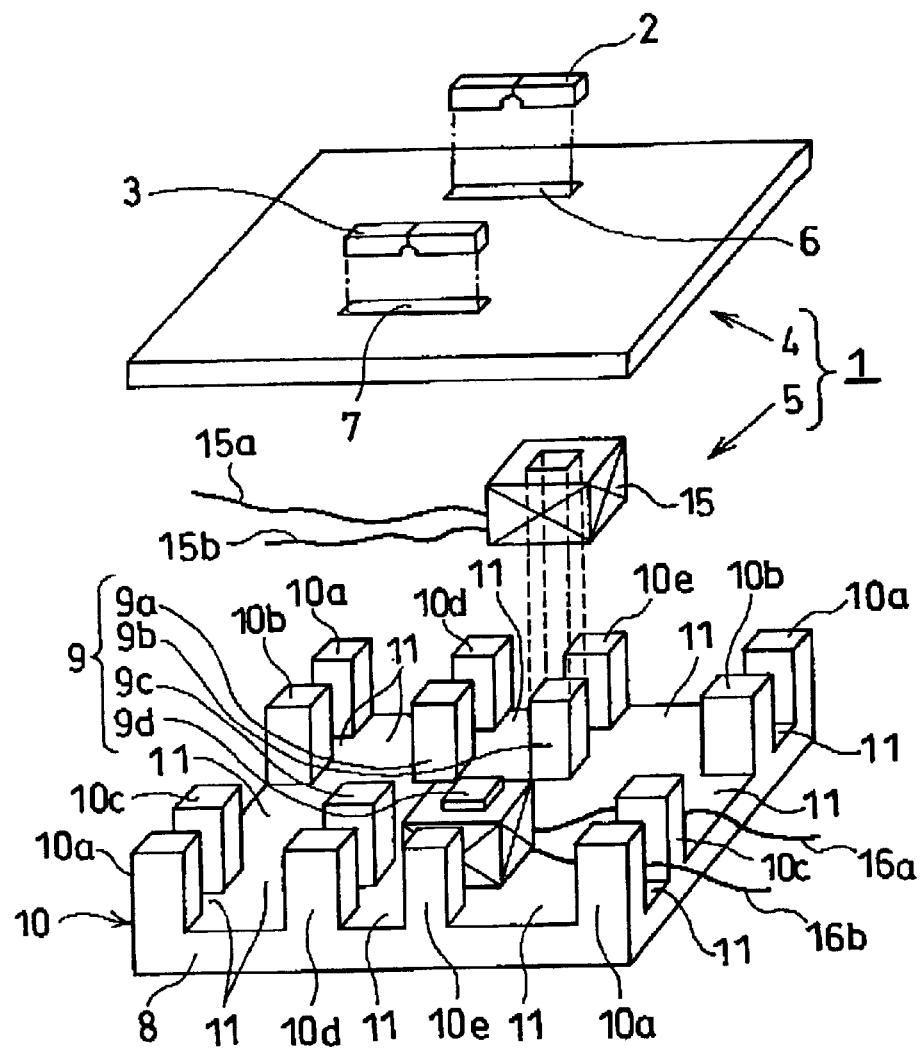
FIG. 1 is an exploded perspective view showing a magnetic head in accordance with a first embodiment of the present invention.
Figure 2:
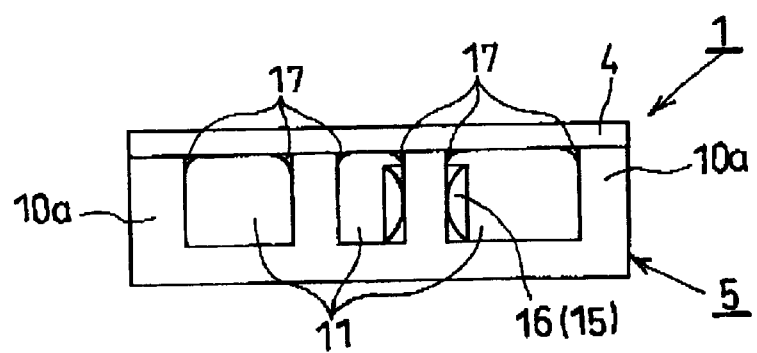
FIG. 2 is a sectional view showing the magnetic head in FIG. 1.

As shown in FIGS. 1 and 2, a magnetic head 1 generally comprises a rectangular plate-like slider 4 having magnetic cores (hereinafter referred to as a first magnetic core 2 and a second magnetic core 3) to cope with two recording media having respective recording densities different from each other, and a back yoke 5 molded using a soft magnetic material, forming closed magnetic circuits in association with the first magnetic core 2 and the second magnetic core 3 and holding the slider 4. For reference, the magnetic head 1 is a so-called separated type of magnetic head, in which the slider 4 and the back yoke 5 which are provided separately are put together for assembly.

A face of the slider 4, which slides on a recording medium (not shown), that is, an upper face in FIG. 1, is provided with two substantially rectangular openings (hereinafter referred to as a first opening 6 and a second opening 7). The first magnetic core 2 and the second magnetic core 3 having respective gaps different from each other are inserted in these first and second openings 6 and 7 and the openings 6 and 7 are sealed up with a sealer such as glass. In this case, the first magnetic core 2 and the second magnetic core 3 are both thinner than the slider 4 (approximately 0.3 mm) into which the magnetic cores 2 and 3 are inserted, whereby the magnetic cores do not project from a surface of the slider 4 once they are sealed in the openings 6 and 7, and are protected from damage during manufacturing or transportation, resulting in reduction in cost.

The first magnetic core 2 is for a standard recording density floppy disc (standard recording density FDD), and the second magnetic core 3 is for a high recording density floppy disc drive (high recording density FDD), and each of them as a magnetic head has a given gap, whereby only one of the magnetic head 1 can fulfill a read-write operation for two recording media having respective capacities different from each other (that is, it has compatibility for magnetic recording).

The back yoke 5 comprises a rectangular plate-like back yoke body 8 provided parallel to the slider 4, inner pillars 9 provided corresponding to the first magnetic core 2 and the second magnetic core 3 both of which are put in the slider 4 and forming closed magnetic circuits in association with the first magnetic core 2, the second magnetic core 3 and the back yoke body 8, and four walls 10 standing upright on respective edges of the back yoke body 8, connected to the slider 4 and including a plurality of cut-outs 11.

The inner pillars 9 comprise a pair of inner pillars 9a, 9b (hereinafter referred to as "a first inner pillar 9a for the first magnetic core" and "a second inner pillar 9b for the first magnetic core", respectively) which correspond to the first magnetic core 2 assembled in the slider 4 and are disposed in parallel with the longitudinal direction of the back yoke body 8, and another pair of inner pillars 9c, 9d (hereinafter referred to as "a first inner pillar 9c for the second magnetic core and a second inner pillar 9d for the second magnetic core, respectively) which correspond to the second magnetic core 3 and are disposed in line with the first inner pillar 9a for the first magnetic core 2 and the second inner pillar 9b for the first magnetic core 2.

The four walls 10 include a plurality (twelve in this embodiment) of cut-outs 11 in such a manner that rectangular column-like wall pillars are formed at the following portions: portions 10a (wall pillars 10a) at the four corners of the back yoke body 8; portions 10b (wall pillars 10b) on the extended line from the first and second inner pillars 9a and 9b for the first magnetic core at both shorter sides of the back yoke body 8; portions 10c (wall pillars 10c) on the line extended from the first and second inner pillars 9c and 9d for the second magnetic core at both shorter sides of the back yoke body 8; portions 10d (wall pillars 10d) on the line extended from the first inner pillar 9a for the first magnetic core and the first inner pillar 9c for the second magnetic core at both longer sides of the back yoke 8; and portions 10e (wall pillars 10e) on the line extended from the second inner pillar 9b for the first magnetic core and the second inner pillar 9d for the second magnetic core at both longer sides of the back yoke 8.

In this case, the four walls 10 stand upright on respective edges of the rectangular plate-like back yoke body 8 as shown in FIG. 1 on the left side, the right side, the upper side and the lower side (the numerals thereto are omitted). Three cut-outs 11 are present on each of the four walls 10.

The second inner pillar 9b for the first magnetic core is provided with a read/write coil 15 for a standard recording density FDD wound in advance, and the second inner pillar 9d for the second magnetic core is provided with a read/write coil 16 for a high recording density FDD wound in advance. Lead wires 15a, 15b, 16a and 16b at starting end and finishing end of the respective coils 15 and 16 are adapted to be let through different cut-outs 11, respectively.

Further, although only the second inner pillars 9b and 9d are provided with coils in FIG. 1, a so-called balanced coil may be employed in which also the first inner pillars 9a and 9c are each provided with a coil wound in an opposite direction to the coils of the second inner pillars 9b and 9d, and the respective coils are coupled to the coils of the first inner pillar 9a and the second inner pillar 9b, respectively. After the lead wires are let through the cut-outs outward, the slider 4 and the back yoke 5 are coupled together and fixed with adhesives or the like, then the lead wires are soldered to FPC or the like. If soldering is carried out before the slider 4 and the back yoke 5 are coupled together and fixed, a fume generated in soldering may adhere to the top surface of the inner pillar 9 thereby generating a gap between the slider 4 and the inner pillars 9.

The magnetic head thus formed is provided with the read/write coil 15 for a standard recording density FDD and the read/write coil 16 for a high recording density FDD, and one magnetic head 1 is capable of reading and writing on two recording media having respective capacities different from each other (that is, has compatibility for magnetic recording).

Further, the back yoke 5 is formed of a soft magnetic material, whereby a good performance of reading and writing can be obtained.

Figure 6:
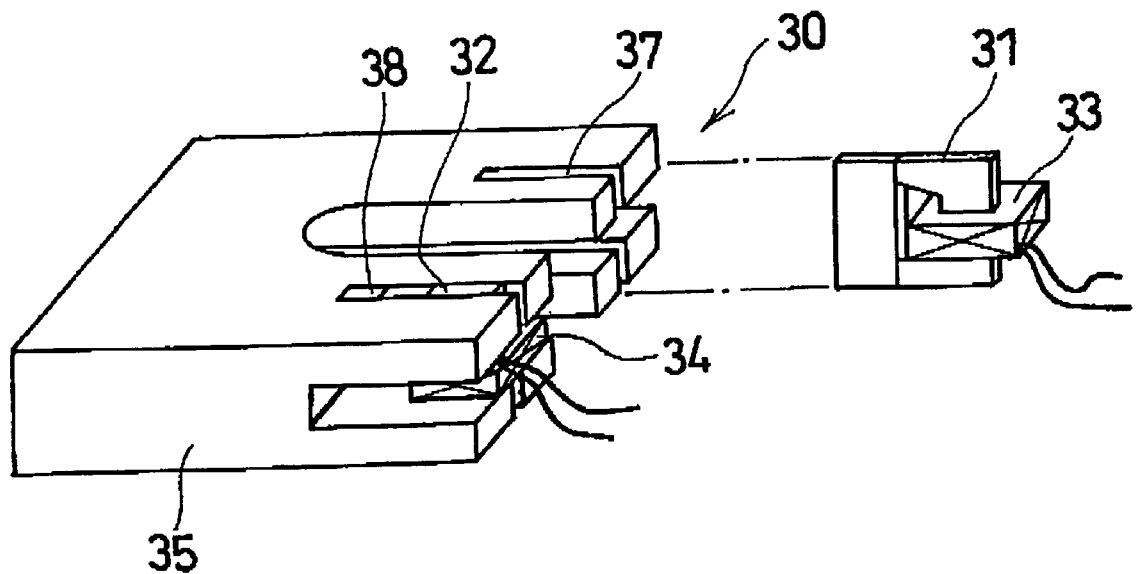
FIG. 6 is an exploded perspective view showing an example of the conventional magnetic head.
Figure 7:
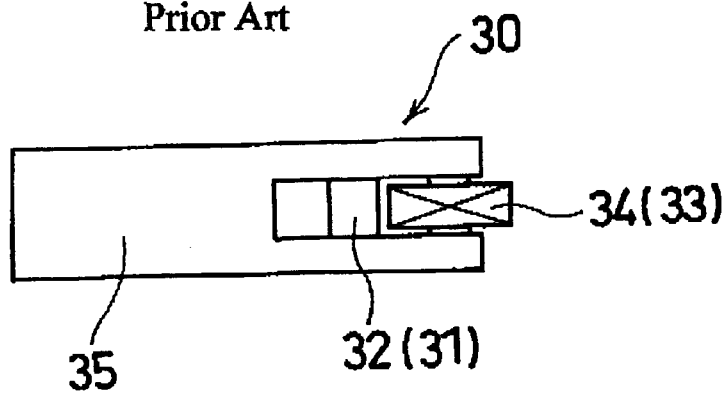
FIG. 7 is a side view showing the magnetic head in FIG. 6.
Figure 8:
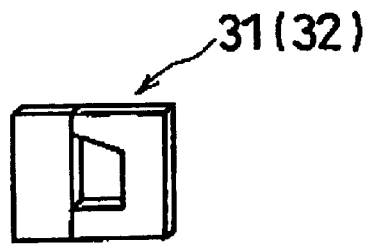
FIG. 8 is a perspective view showing the magnetic core in FIG. 6.

The closed magnetic circuits formed corresponding to the read/write coil 15 for a standard recording density FDD and the read/write coil 16 for a high recording density FDD are present separately toward the slider 4 and the back yoke 5. Therefore, in order to form these closed magnetic circuits, the magnetic cores (the first magnetic core 2 and the second magnetic core 3) and the back yoke 5 may only be connected to each other after the first coil 15 and the second coil 16 are put around the inner pillars 9b and 9d of the back yoke 5 respectively, whereby it can be prevented from happening that the magnetic cores are damaged at the winding process, which may, as described above, occur in the conventional art shown in FIGS. 6 to 8. Hence, the yield of the slider 4 can be improved, damages of the magnetic cores at the winding process can be prevented and the cost related to the winding process can be reduced.

Further, the four lead wires (15a, 15b, 16a, 16b) at the starting end and the finishing end of the read/write coils 15 and 16 are let through different cut-outs 11, respectively, so the two lead wires 15a, 15b at the starting and finishing ends of the read/write coil 15 are not to be mistaken for each other at the time of wiring, and the two lead wires 16a, 16b at the starting and finishing ends of the read/write coil 16 are not to be mistaken for each other at the time of wiring. Further, in the case of the balanced coil in which the inner pillar 9a and the inner pillar 9c are also provided with respective windings, there are eight lead wires in total, but mistakes can be avoided at the time of wiring since there are twelve cut-outs on the back yoke 5.

In this embodiment, as three cut-outs 11 are formed on each of the four walls 10, three lead wires can be individually passed through the respective cut-outs 11 per wall, which is convenient when many lead wires are used.

For reference, the number of cut-out 11 formed on each wall is not limited to three, but may be four or more.

The wall pillars 10a–10e, which are formed by remaining intact on the four walls 10 when the cut-outs 11 are formed, serve to magnetically shield the read/write coils 15 and 16 from the outside in operation of the magnetic head.

The back yoke 5 and the slider 4 are connected to each other in such a manner that the slider 4 is supported by the wall pillars 10a–10e, where the magnetic cores 2 and 3 form respective closed magnetic circuits with the inner pillars 9. But the first magnetic core 2 (magnetic head) for a standard recording density FDD and the second magnetic core 3 (magnetic head) for a high recording density FDD are not to be operated at the same time, therefore it does not happen that the magnetic flux of one magnetic core has an adverse effect on that of the other.

Further, at the time of the connection of the back yoke 5 and the slider 4, which is carried out by applying an adhesive 17 to the skirts of areas where the back yoke 5 and the slider 4 contact with each other, the adhesive 17 can be applied by inserting a needle of a dispenser into the cut-outs 11 formed on the four walls 10, whereby amount of adhesive to be applied can be controlled easily and application work becomes easier, resulting in elimination of poor adhesion.

Figure 9:
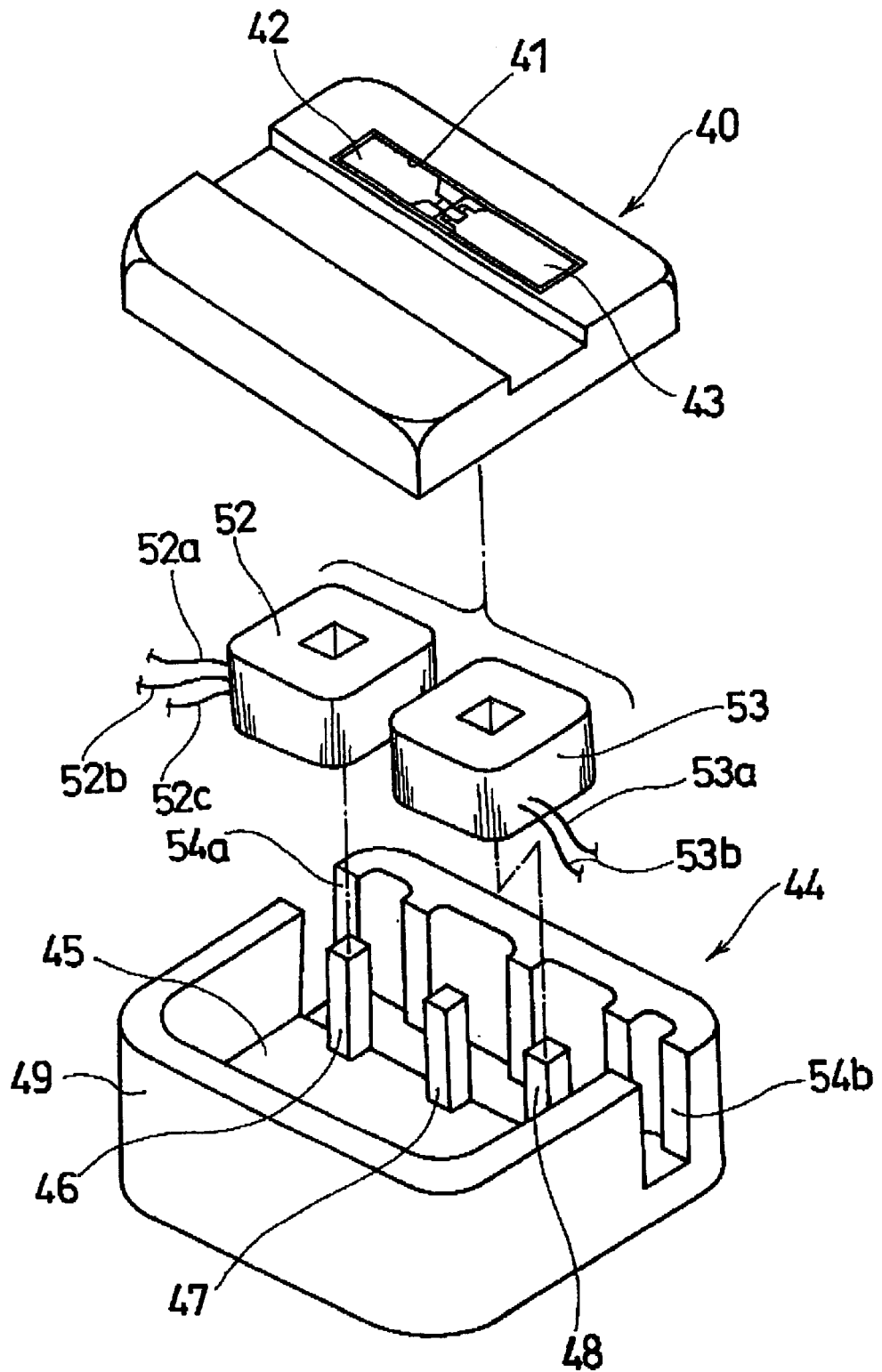
FIG. 9 is an exploded perspective view showing another conventional magnetic head.
Figure 10:
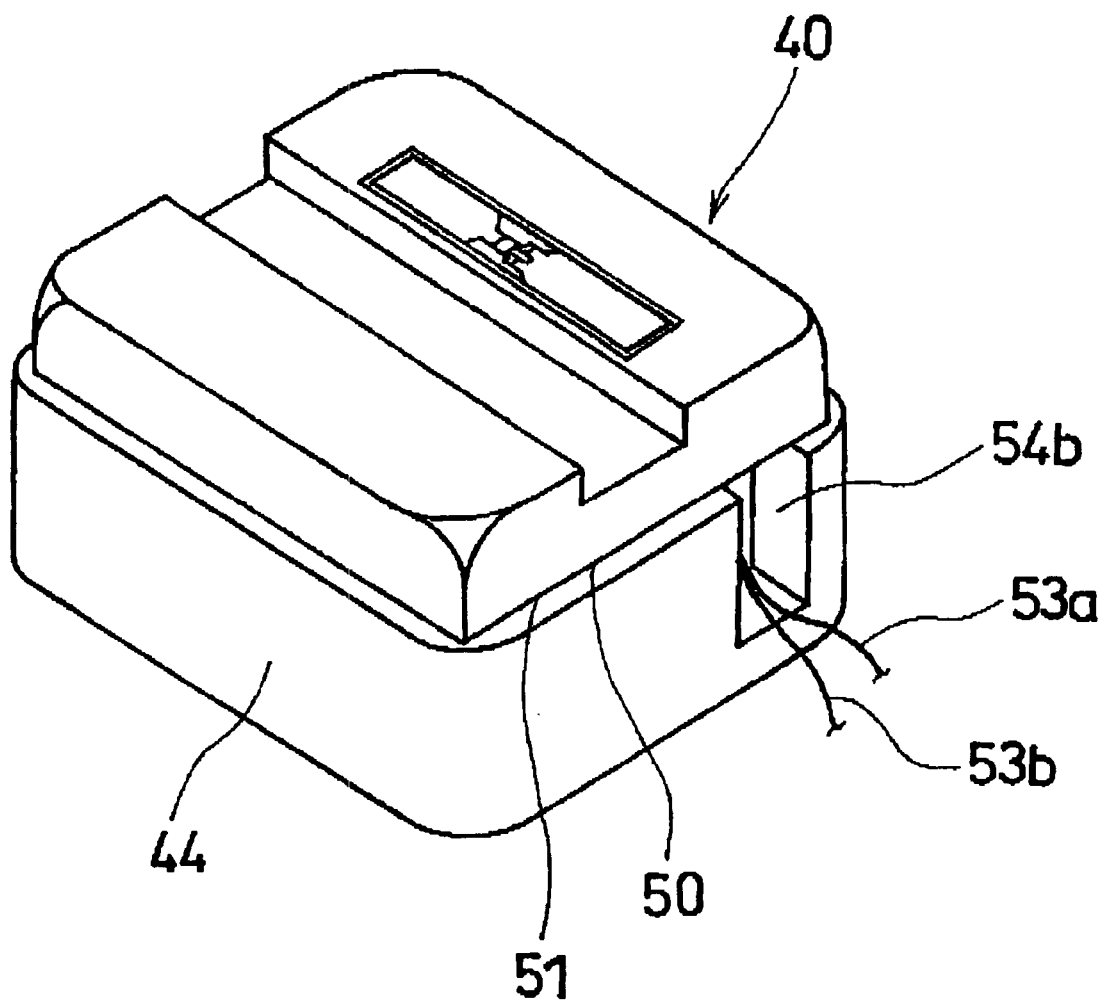
FIG. 10 is a perspective view showing the magnetic head in FIG. 9.

In case of a magnetic head shown in FIGS. 9 and 10, resin is applied on an uncovered space of the top surface portion of the outer circumference wall portion 49, and it is difficult to control amount of resin to be applied, and in some cases resin may be accidentally attached to the top surface of the slider 40 or poor adhesion may be caused due to an insufficient amount of resin.

Further, Japanese Patent Application Laid-open No. Hei 11-149608 discloses a magnetic head which comprises a head chip portion to be in contact with a flexible disc, a core forming member mounted on a face portion opposite to a face opposing the flexible disc of the head chip portion, and a coil portion having a coil and a bobbin to put the coil therearound and mounted on a leg portion of the core forming member, wherein the bobbin comprises a cylindrical portion and a terminal portion formed perpendicularly at an lower end of the cylindrical portion, and the terminal portion of the coil portion is adapted to be disposed outside the core forming member when the coil portion is mounted on the leg portion of the core forming member.

The magnetic head disclosed in the publication described above is connected to an outer circuit via the terminal portion of the coil portion, thereby making its structure comparatively complicated with regard to connecting the coil and the outer circuit. On the other hand, in the embodiment of the present invention, the lead wires of the coil can be connected directly to an outer circuit, whereby the structure becomes simple, enabling reduction in cost of the apparatus.

Figure 3:
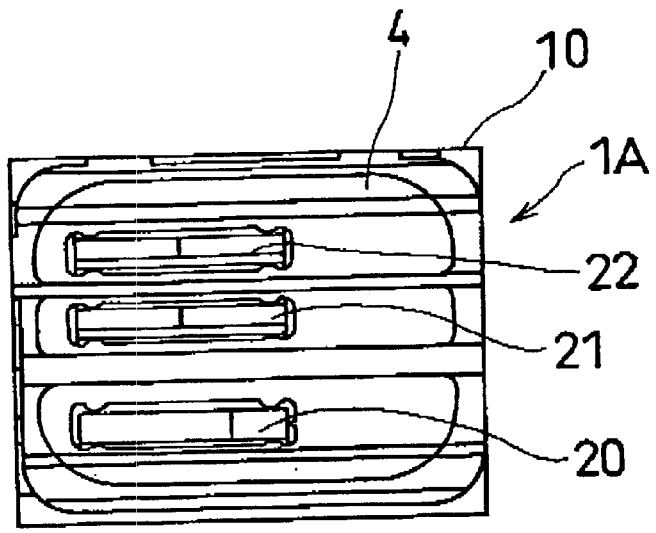
FIG. 3 is a plan view showing a magnetic head in accordance with a second embodiment of the present invention.
Figure 4:
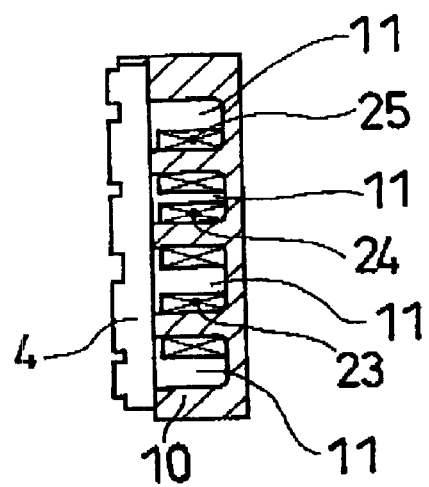
FIG. 4 is a sectional view showing the magnetic head in FIG. 3.
Figure 5:
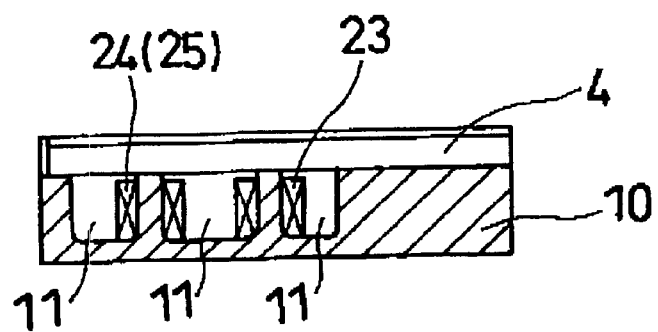
FIG. 5 is a sectional view showing the magnetic head in FIG. 3.

Although the above first embodiment of the present invention illustrates the magnetic head 1 which comprises the first and second cores 2 and 3, and the read/write coils 15 and 16 for a standard recording density FDD and a high recording density FDD, respectively, and which is capable of reading and writing on two recording media having respective capacities different from each other, the present invention is not limited to this. It may be a magnetic head 1A (a second embodiment) constructed as shown in FIGS. 3 to 5.

This magnetic head of the second embodiment is provided with three magnetic cores (a first magnetic core 20, a second magnetic core 21 and a third magnetic core 22), and read/write coils 23, 24 and 25 respectively for a standard recording density FDD and for a first and a second high recording density FDD are put on the firsts second and third magnetic cores 20, 21 and 22, respectively.

The second magnetic core 21 and the read/write coil 24 for a first high recording density FDD may obtain a larger recording density than the first magnetic core 20 and the read/write coil 23 for a standard recording density FDD, and a still larger recording density can be obtained with the third magnetic core 22 and the read/write coil 25 for a second high recording density FDD.

Two lead wires (not shown) at respective starting and finishing ends of each of the coils 23, 24 and 25 are let separately through the respective cut-outs 11.

In this second embodiment, read/write operation can be carried out on three recording media having respective capacities different from each other.

Further, since the two lead wires at respective starting and finishing ends of each of the coils 23, 24 and 25 put on are let separately through the respective cut-outs 11, mistakes can not happen in wiring like the first embodiment.

According to the first aspect of the present invention, the four walls include cut-outs in number equal to or larger than number of the lead wires of a plurality of coils and the plurality of lead wires each can be let separately through the respective cut-outs, whereby, for instance, two lead wires at the starting and finishing ends are not mistaken for each other in wiring. Therefore, a wiring error that can occur in the conventional art where a plurality of lead wires are passed through one cut-out is eliminated and an extremely careful work that has been essential to the process of conventional art is no longer required, thereby enhancing the workability and productivity.

Further, the magnetic head of the present invention includes a plurality of magnetic cores having respective recording densities different from each other and a plurality of coils provided corresponding to the plurality of magnetic cores, therefore is capable of reading and writing on plural kinds of recording media having respective recording densities different from each other, that is, the magnetic head is adapted to have compatibility for magnetic recording.

According to the second aspect of the present invention, at least three cut-outs are provided on each of the four walls, so three or more lead wires can be let separately through the respective cut-outs per wall, providing convenience.

According to the third aspect of the present invention, since the back yoke is molded using a soft magnetic material, the magnetic head can obtain a good performance of reading and writing.

According to the fourth aspect of the present invention, one magnetic head is capable of fulfilling a read/write operation for a standard recording density FDD and a high recording density FDD.

What is claimed is:

1. A magnetic head comprising:
    a slider which slides on a magnetic recording medium, and accommodates and holds a plurality of magnetic cores having respective gaps and recording densities different from each other in a plurality of openings formed on a sliding side, respectively; and
    a back yoke which comprises a substantially plate back yoke body provided parallel to the slider, a plurality of inner pillars standing upright on the back yoke body and four walls standing upright on respective edges of the back yoke body and connected to the slider and which is connected to the magnetic cores thereby forming closed magnetic circuits, holds the slider, and includes a plurality of coils provided on the plurality of inner pillars provided corresponding to the plurality of magnetic cores, respectively;
    wherein the four walls include cut-outs in number equal to or larger than number of lead wires of the plurality of coils.

2. The magnetic head according to claim 1, wherein at least three cut-outs are provided on each of the four walls.

3. The magnetic head according to claim 2, wherein the back yoke, the inner pillars and the walls are integrally molded using a soft magnetic material.

4. The magnetic head according to claim 2, wherein at least two of the plurality of magnetic cores are for a low recording density floppy disc drive and a high recording density floppy disc drive, respectively.

5. The magnetic head according to claim 1, wherein the back yoke, the inner pillars and the walls are integrally molded using a soft magnetic material.

6. The magnetic head according to claim 5, wherein at least two of the plurality of magnetic cores are for a low recording density floppy disc drive and a high recording density floppy disc drive, respectively.

7. The magnetic head according to claim 1, wherein at least two of the plurality of magnetic cores are for a low recording density floppy disc drive and a high recording density floppy disc drive, respectively.

* * * * *